United States Patent [19]

Plumat et al.

[11] 4,129,434

[45] * Dec. 12, 1978

[54] PROCESS FOR FORMING A METAL OXIDE COATING

[75] Inventors: Emile Plumat, Gilly; Robert Posset, Mont-sur-Marchienne, both of Belgium

[73] Assignee: Glaverbell, Watermael-Boitsfort, Belgium

[*] Notice: The portion of the term of this patent subsequent to Nov. 26, 1991, has been disclaimed.

[21] Appl. No.: 605,815

[22] Filed: Aug. 19, 1975

Related U.S. Application Data

[63] Continuation of Ser. No. 269,400, Jul. 6, 1972, abandoned.

[30] Foreign Application Priority Data

Jul. 8, 1971 [LU] Luxembourg .......................... 63490

[51] Int. Cl.² ............................................ C03C 17/00
[52] U.S. Cl. .................... 65/60 D; 65/60 C; 427/168; 427/169; 427/226; 427/229; 427/427
[58] Field of Search ............... 427/226, 230, 229, 427, 427/106, 168, 169; 65/60 D, 60 C

[56] References Cited

U.S. PATENT DOCUMENTS

| | | | |
|---|---|---|---|
| 2,859,131 | 11/1958 | Watkins et al. | 427/126 |
| 2,976,285 | 3/1961 | Gash | 260/242 |
| 3,081,200 | 3/1963 | Thompkins | 427/126 |
| 3,107,177 | 10/1963 | Saunders | 427/314 |
| 3,410,710 | 11/1968 | Mochel | 427/166 |
| 3,411,934 | 11/1968 | Englehart | 65/60 |
| 3,645,778 | 2/1972 | Nesteruk | 428/432 |
| 3,652,246 | 3/1972 | Michelohi et al. | 65/60 |
| 3,689,304 | 9/1972 | Bamford | 427/226 |
| 3,711,322 | 1/1973 | Kushihashi et al. | 428/432 |
| 3,754,975 | 8/1973 | Spiller | 427/229 |
| 3,850,665 | 11/1974 | Plumat et al. | 427/168 |

*Primary Examiner*—Ronald H. Smith
*Assistant Examiner*—Janyce A. Bell
*Attorney, Agent, or Firm*—Edmund M. Jaskiewicz

[57] ABSTRACT

A metal oxide coating is formed on a vitreous or non-vitreous substrate by applying a solution containing at least one metal compound to the substrate and then heating the coated substrate to convert the compound in situ to leave a coating of metal acetyl acetonate or a mixture of metal acetyl acetonates in a solvent including an aprotonic solvent, a substituted or unsubstituted monocarboxylic acid solvent, an amine or diamine solvent, or a mixture of two or more solvents selected from these groups.

9 Claims, No Drawings

PROCESS FOR FORMING A METAL OXIDE COATING

This is a continuation of application Ser. No. 269,400 filed July 6, 1972, now abandoned.

The present invention relates to the formation of a metal oxide coating on a substrate, more particular, to the process of forming such a coating by applying a solution containing a metal compound to the substrate and converting the compound in situ by heating to leave the coating of metal oxide and the article coated by such process.

It is known to form oxide, e.g., cobalt oxide, coatings by spraying a solution of a hydrated metal salt in water, e.g., an aqueous solution of $CoCl_2.6H_2O$ or $FeCl_3.6H_2O$, onto a substrate surface heated to a sufficiently high temperature to bring about conversion of the metal salt in situ. The coating resulting from this process is usually of poor quality, particularly in terms of its degree of uniformity of thickness and composition. When applying such an aqueous cobalt salt solution, for example, the coatings comprise a granular deposit of irregular thickness, and the coating usually has very poor adherence to the substrate. Coatings so formed can often be removed in the form of particles simply by rubbing a finger along the coating or by applying a piece of adhesive tape onto the coating and then peeling the tape away.

It is therefore the principal object of the present invention to provide a process whereby metal oxide coatings of uniform thickness and composition can be easily formed on various substrates.

It is another object of the present invention to provide a process whereby metal oxide coatings having a high degree of uniformity can be formed on substrate surfaces which are at least partly vitreous and which process can therefore be adopted for forming optical coatings on vitreous bodies and articles, e.g., glazing sheets, windscreens, sheets of patterned rolled glass, and lenses for sunglasses.

According to the present invention there is provided a process for forming a metal oxide coating on a substrate wherein a solution of at least one metal compound is applied to the substrate and said compound is converted in situ to leave a coating of at least one metal oxide. The solution used for coating the substrate is a solution of a metal acetyl acetonate or a mixture of metal acetyl acetonates in an aprotonic solvent, a substituted or unsubstituted monocarboxylic acid solvent, an amine or diamine solvent, or a mixture of two or more solvents selected from solvents of those classes.

By applying this process, it is possible to form metal oxide coatings which are of substantially uniform thickness and composition, as is required for example in the case of very thin coatings having a substantial light-transparency. The process is therefore very suitable for forming optical coatings on vitreous bodies or articles for modifying their light-transmitting and/or light-reflecting properties, e.g., for giving the bodies or articles a tinted appearance when viewed by transmitted or reflected light.

The coating uniformity which is made possible by the invention is due not only to the use of a solution of a metal acetyl acetonate but also to the selection of a solvent from the specified classes. In general, such solvents are very good solvents for the metal acetyl acetonates most suitable for use in forming metal oxide surface coatings, in particular optical coatings. These compounds can therefore be applied in relatively highly concentrated solution. Another important factor is the safety with which these solvents can be used under conditions in which they are exposed to very high temperatures. It is therefore possible to bring about very rapid heating and evaporation of the solvent from the applied coating and rapid conversion of the metal compound or compounds, and this is also an important factor for promoting the formation of coatings of uniform density.

Preferably the substrate is pre-heated to a sufficiently high temperature to provide the heat required to effect the said conversion of the metal acetyl acetonate. By pre-heating the substrate it is possible to bring about evaporation of the solvent and conversion of the metal compound or compounds substantially immediately on contact of the solution with the substrate. As already indicated, this rapid conversion promotes coating uniformity. In general, for the purposes of this invention, the optimum temperature of the substrate at the time that it is coated is in the range of 300° to 700° C. The temperature should in general preferably be chosen as high as possible consistent with avoiding impairment of the substrate. For coating vitreous substrates, the recommended temperature range is 450° to 650° C. By working within this range, very uniform coatings can be formed and moreover a very strong adherence of the coating to the vitreous substrate can be achieved, this adherence also being influenced by the temperature of the substrate on coating.

The solution of metal acetyl acetonate(s) is preferably applied in the form of droplets to achieve the required results. Use can be made of an inside-mixing atomising gun fed separately with compressed air and the solution of metal acetyl acetonate(s), both at the same pressure, which may e.g., be of the order of 1.5 kg/cm² above atmospheric pressure. The acetyl acetonate solution itself can be at ambient temperature or any higher temperature provided that there is no undue premature evaporation of the solvent or decomposition and oxidation of the acetyl acetonate(s), and provided that the substrate is not subjected to a harmful thermal shock.

As examples of suitable aprotonic solvents, the following are cited: dimethylformamide, dimethylacetamide, tetramethylurea, dimethylsulphoxide, acetonitrile, nitrobenzene, ethylene carbonate, tetramethylenesulphone, hexamethylphosphoramide.

Particular preference is given to dimethylformamide. This solvent is a particularly good solvent for most of the acetyl acetonates which are of interest for forming optical coatings so that the acetyl acetonate(s) can be applied in relatively high concentrations. This means that the volume rate of application of the solution to a given area of substrate surface can be relatively low for achieving a given coating thickness. Dimethylformamide can also be used for coating substrates at very high temperatures without creating a fire hazard.

When selecting an aprotonic solvent for use in carrying out the invention, preference is given to those having a dielectric constant greater than 15 and a dipolar moment greater than 3D. It has been found that these are properties of the most satisfactory of the aprotonic solvents. Such properties are possessed by all of the specific aprotonic solvents hereinbefore idetified. (D = Debye unit)

Suitable solvents for use in carrying out the invention also include substituted and unsubstituted monocarboxylic acids. Preference is given to aliphatic substituted and unsubstituted monocarboylic acids. Particularly good examples include acetic acid ($CH_3COOH$), butyric acid ($CH_3CH_2COOH$), acrylic acid ($CH_2CHCOOH$), thioglycolic acid ($HSCH_2COOH$), formic acid ($HCOOH$).

The third specified class of solvents which can be used in carrying out the invention comprises amine and diamine solvents. Preference is given to alkyl and alkylene amino and diamino solvents in which the amino group or groups is or are unsubstituted. Particularly good examples include: ethylene diamine, propylene diamine, butyl amine, propyl amine. These solvents do not decompose to yield oxygen and the process can be performed using such a solvent or solvents to obtain a sub-oxide coating, e.g., vanadium dioxide ($VO_2$).

Preference is given to embodiments of the invention in which the solution applied to the substrate is a solution of an acetyl acetonate of a metal selected from the group: Fe, Ni, Co, Zn, V, Mn, Cu, In, Al, Ti, Zr, Th and Cr or a mixture of acetyl acetonates of two or more metals of such group. When using such solutions, thin metal oxide coatings of very high quality are formed for modifying the light-reflecting or the light-transmitting properties of a substrate and the oxide coatings adhere very well to ceramic substrates and to substrates made of glass or partly vitreous material, e.g., vitrocrystalline or vitroceramic materials which are the main substances requiring to be obticailly coated. Other important embodiments are embodiments in which the acetyl acetonate solution applied to the substrate is an acetyl acetonate of a metal selected from the group: Mg, Bi, V, W and Ce.

As disclosed previously, the invention is of special importance for forming metal oxide coatings on vitreous and partly vitreous substrates, e.g., substrates of vitrocrystalline or vitroceramic material. This is because of the ability of the process to produce thin metal oxide coatings of a high degree of uniformity in thickness and density which are desirable properties in optical coatings for the purpose of tinting or otherwise modifying the optical properties of the bodies or articles in which they will be used. In the following more detailed description the invention will be considered mainly in the context of the optical coating of vitreous and partly vitreous substrates, for which purpose coatings comprising one or more oxides of one or more of the metals hereinbefore listed are the ones which are mainly but by no means exclusively useful.

Vitreous and partly vitreous articles or bodies of any shape can be coated by the process to impart a predetermined tint thereto, but more particularly in order to impart special light-reflecting properties. The process is very advantageous for forming all-over coatings on transparent vitreous bodies and articles, e.g., on vehicles windscreens or glazing sheets, because metal oxide coatings can be formed which give the article or body a predetermined tint as viewed both by transmitted and reflected light. The process is not only useful for forming a metal oxide coating directly on a glass or partly vitreous surface but also for forming such a metal oxide coating on an already formed coating film which is strongly adherent to the vitreous substrate, and particularly on an existing metal oxide film, e.g., a film of titanium or copper oxide.

A further application of the process is for coating a heat-absorbing glass with a highly reflecting layer, without substantially increasing the energy absorption.

The light or energy transmission of a coating of a given thickness can be increased without substantially altering the light or energy reflectance, by using appropriately selected metal acetyl acetonates, e.g., one or more acetyl acetonates of a metal or metals of the group: aluminium, zinc, thorium, cerium, yttrium and magnesium.

For forming an optical coating on flat glass, the process can be particularly economically performed by spraying a solution of a metal acetyl acetonate or a mixture of metal acetyl acetonates onto a continuous glass ribbon during the course of its production, e.g., at a coating station located in the drawing chamber of a glass drawing machine or in an annealing lehr. The solution is preferably applied where the glass is at temperatures within the temperature range of 300° to 700° C. most preferably 450° to 650° C., as disclosed above. The spray of coating solution may be directed normally to the glass ribbon and the spraying device can then be reciprocated transversely of the direction of movement of the ribbon past the coating station.

For the purposes mainly in view, the thickness of the metal oxide coating which is formed preferably lies in the range of 200 to 1000 Å. The thickness selected in any given case will depend on the intended function of the coating. A coating of a given thickness can be built up by applying two or more layers in succession. The thickness of a coating can best be measured by interferometry; but it is also possible to dissolve the coating and to determine the weight of the coating per unit surface area analytically, the thickness then being calculated taking into account the known density of the oxide and its degree of compaction in the coating.

By using a mixture of two or more metal acetyl acetonates it is possible to control the tint of the coating viewed by transmitted and/or reflected light by adjusting the proportions of the different compounds. By way of example, use can be made of a mixture of nickel acetyl acetonate and cobalt acetyl acetonate; vanadium acetyl acetonate and zirconium acetyl acetonate; manganese acetyl acetonate and chromium acetyl acetonate; copper acetyl acetonate and titanyl acetyl acetonate; cobalt acetyl acetonate and iron acetyl acetonate. When using iron acetyl acetonate its proportion by weight in the mixture of oxides should preferably not exceed 50% to make the coating sufficiently resistant to chemical change by the action of atmospheric moisture. Such mixtures of metal acetyl acetonates are preferably dissolved in an aprotonic solvent, e.g., dimethylformamide, an organic acid solvent, e.g., glacial acetic acid, an amine or diamine solvent or a mixture of two or more of such solvents.

It may be desirable to use the metal acetyl acetonate or acetonates in perfectly crystallised form so that such compounds can be completely dissolved in the solvent. By way of example, it is possible to prepare in perfectly crystallised state: cobalt acetyl acetonate crystallised with two molecules of water, anhydrous nickel acetyl acetonate, and copper acetyl acetonate crystallised with one molecule of water. An anhydrous cobalt acetyl acetonate can be obtained commercially which is, e.g., prepared from cobalt nitrate, but this anhydrous acetyl acetonate is not very soluble in an organic acid such as acetic acid. The solution has to be filtered and in consequence the yield is low.

When forming the solution of metal acetyl acetonate(s) the total amount of such compound or compounds to be used is preferably dissolved very gradually. In order to form a solution of two different acetyl acetonates, the total amount of one acetyl acetonate is preferably dissolved first, the other acetyl acetonate then being added gradually to such already formed solution. Thus when making a solution of iron and cobalt acetyl acetonates, the iron acetyl acetonate is preferably dissolved first, the cobalt acetyl acetonate then being gradually added to and dissolved in the already formed solution of the iron compound.

The preparation of the solution in the manner described favors the production of solutions which are stable for long periods of time, and because they remain free from precipitation they need not be filtered before use.

In general, up to 10% by volume of distilled water can be tolerated in the coating solution. Above that limit of water, the formed coating is liable to be marred by very small, dark stains often referred to as "pittings". It is to be noted, however, that the appearance of such defects to any material degree depends in part on various other factors, and more particularly on the composition and geometry of the coated surface and the coating thickness. The said defects are much less apparent on patterned glass having a fairly close pattern, on wired glass (glass incorporating a wire mesh reinforcement), on certain vitrocrystalline materials and on profiled glass, e.g., glass bodies of U-shape, than on planefaced flat glass. Even when applied onto a plane glass face, the presence of the said defects tends to be less apparent according as the thickness of the coating is greater. On the other hand the greater the thickness of the coating the less is the light-transmissivity of the coating and where this factor is of importance the optimum coating thickness represents a compromise between the competing objectives of freedom from defects and a high degree of light-transparency.

To take a particular example, a coating of cobalt oxide formed on a plane glass surface and having an optical thickness of 500 Å, has a light transmissivity of 47% and unless the best conditions as herein directed for obtaining a coating free of defects are observed, defects may be present and are liable to be apparent to the naked eye. However, if the same coating solution is applied to form an oxide coating having an optical thickness of 900 Å the imperfections in the coating are hardly if at all apparent but the light transmissivity is in that case only 26%.

Generally speaking, coatings formed according to the invention and using the preferred coating ingredients are very hard. Glazings bearing such coatings can be used with the coating exposed because it is for normal purposes sufficiently resistant to mechanical damage, but of course a coating formed according to the invention can if necessary be protected by a protective layer, e.g., by a layer of $SnO_2$.

A metal acetyl acetonate for use in forming a coating solution to be used in a process according to the invention can be prepared by bringing a metal compound such as a metal halide, if necessary in hydrated form, into contact with acetyl acetone, in the presence of an alkali metal acetate, so that the acetyl acetonate is perfectly crystallised. For instance, a cobalt acetyl acetonate can be prepared by dissolving bivalent cobalt chloride, crystallised with six molecules of water, in distilled water, which may also contain a small amount of ethyl alcohol to improve the manufacturing yield on condition that there is no risk of fire or explosion, and mixing this solution, preferably in stoichiometric proportion, with an aqueous solution of sodium acetate in acetyl acetone. The metal acetyl acetonate precipitate obtained is iltered, if necessary washed on the filter with demineralised water, and then dried.

Two or more acetyl acetonates can be prepared in the described manner and then mixed in predetermined proportions to obtain a required optimum composition of the final metal oxide coating.

When preparing a solution of cobalt acetyl acetonate, it is not necessary to crystallise the cobalt acetyl acetonate preparatory to dissolving it. However some acetyl acetonates, such as that of iron, may require to be recrystallised in alcohol, if complete solubility in a solvent such as acetic acid is to be achieved.

In the described method of preparing the metal acetyl acetonates, it is often advantageous to use the solution of sodium acetate in acetyl acetone in a higher proportion than the strictly stoichiometric proportion, in relation to the chloride used. For instance, if iron acetyl acetonate is to be obtained, one mole of iron chloride, three moles of acetate and three moles of acetyl acetone can be used, giving a reaction yield of 80%. It is more advantageous to use one mole of iron chloride, six moles of acetate and six moles of acetyl acetone, giving a reaction yield of 97%. Acetyl acetonates correspond to the rough formula $M(C_5H_7O_2)_x$ where x corresponds with the valency of the metal M.

There are of course other methods of preparing metal acetyl acetonates. Thus, a complex such as the acetyl acetonate of indium can be prepared starting from the nitrate and acetyl acetone in the presence of ammonia. For preparing the acetyl acetonate of titanium, it is preferable to start from an organometallic compound such as titanium isopropylate.

The wettability of a vitreous support by the applied solution can be improved, in order to promote uniformity of coating, by means of suitable additives. For example, when applying a solution of cobalt acetyl acetonate in acetic acid, up to 10% by weight of acetyl acetone or iron acetyl acetonate or even zinc acetate can be added to the acetic acid.

To test the hardness and adherence of coatings obtained by the process according to the invention, use can be made of a reciprocating rubbing element having a surface area of 1 $cm^2$ and formed by rubber incorporating corumdum grains 75–125 microns in diameter. The rubbing member is set in a weighted tube (weight of assembly: 100 gr) sliding vertically in a support. Constant contact is therefore ensured between the rubbing member and the sample. The assembly formed by the rubbing member and the support is reciprocated by a crank system. The amplitude of the movement is 3 cm, its frequency being 1 reciprocation per second. After a certain time a pattern of wear is obtained formed by scratches very close together with undestroyed coating left therebetween. In various tests, it was found that after five minutes, 5% of the surface area subjected to the rubbing was spoiled by scratching. It took at least one hour for 95% of the surface to be scratched.

The invention will be better understood and its advantages better appreciated from the following description of a number of non-limitative examples thereof.

EXAMPLE 1

Various filmogenic solutions were prepared for use in forming on vitreous substrates, coatings respectively comprising an oxide of chromium, titanium, iron, zirconium, cobalt and zinc. The solutions were prepared by dissolving the acetylacetonate of the corresponding metal in the solvents identified in the Table set out below.

The concentration of each metal acetylacetonate solution corresponded to 40 g of the corresponding metal oxide per liter of solution.

The solutions were sprayed onto pieces of flat glass 4 mm in thickness, pre-heated to a temperature of the order of 580° C.

The radiation transmitting, reflecting and absorbing characteristics of the metal oxide layers obtained are indicated in the Table in which the term "Energy" denotes total radiation energy over the whole spectrum including infrared and ultraviolet light.

| Solvent | $TiO_2$ formic acid | $Fe_2O_3$ glacial acetic acid | $ZrO_2$ ethylene diamine | $Co_3O_4$ dimethyl sulphoxide | Zno propylamine | $Cr_2O_3$ dimethyl formamide |
|---|---|---|---|---|---|---|
| Thickness of coating | 450 Å | 510 Å | 600 Å | 920 Å | 300–350 Å | 600 Å |
| Tint by transmitted light | grey | yellow-amber | grey | brown | grey | greenish grey |
| Energy transmission (%) | 68,1 | 56,0 | 76,3 | 35,5 | 77,4 | 68,2 |
| Energy reflection at coated side (%) | 27,1 | 31,6 | 16,9 | 38,2 | 14,0 | 19,8 |
| Energy absorption at coated side (%) | 4,8 | 12,4 | 6,8 | 26,3 | 8,6 | 12,0 |
| Light transmission (%) | 64,6 | 41,2 | 78,6 | 26,8 | 79,3 | 64,9 |
| Light reflection at coated side (%) | 34,5 | 44,2 | 20,2 | 39,9 | 15,2 | 24,8 |

EXAMPLE 2

This example relates to the formation of a vanadium oxide coating on glass.

Vanadyl acetylacetonate ($VO(C_5H_7O_2)_2$) was prepared by bubbling hydrogen sulphide through a suspension of $V_2O_5$ in acetyl acetone. The product obtained was filtered on fritted glass and dried. The acetyl acetonate thus obtained was in the form of a blue powder.

A filmogenic solution was then prepared by dissolving 200 g of vanadyl acetylacetonate in n-butylamine in an amount of 200 g per liter.

This solution was then sprayed onto glass preheated to a temperature of 530° to 550° C. The solution was applied in an atmosphere containing little or no oxygen but this precaution is not absolutely necessary. The coating obtained in this manner was composed of vanadium dioxide ($VO_2$).

In another test, vanadyl acetylacetonate was dissolved in glacial acetic acid in an amount of 200 g per liter and the solution was sprayed onto pieces of flat glass under the same conditions as those just referred to. In this test, coatings composed of vanadium hemipentoxide ($V_2O_5$) were obtained.

In a subsequent treatment, a sample of glass bearing a coating of vanadium hemipentoxide was heated at a temperature of 550° C. in a reducing atmosphere containing hydrogen. By this after treatment, the coating was converted to a coating of vanadium sesquioxide ($V_2O_3$).

The following table summarises the energy characteristics of the different coatings:

|  | $VO_2$ | $V_2O_5$ | $V_2O_3$ |
|---|---|---|---|
| Tint by transmitted light (for a coating thickness of the order of 450–500 Å) | greenish-blue | yellow | greenish-blue |
| Light transmission (%) | 71,6 | 65 | 52 |
| Energy transmission (%) | 63,1 | 61,8 | 51 |
| Light reflection (%) | 19,9 | 19,9 | 22 |
| Energy reflection (%) | 15,1 | 12,3 | 18,4 |
| Energy absorption (%) | 21,8 | 25,9 | 30,6 |
| Light transmission / Energy transmission | 1,13 | 1,04 | 1 |

EXAMPLE 3

The object was to form on a vitreous substrate, a coating comprising $Co_3O_4$ and $Fe_2O_3$ in relative proportions of 70% and 30% by weight (Test A).

Cobalt acetyl acetonate was first prepared by the following steps:

(1) 202 gr (0.85 mol) of $CoCl_2.6H_2O$ were dissolved in 600 cc of demineralised water and 200 cc of ethyl alcohol;

(2) 340 cc (3.4 mols) of acetyl acetone were dissolved in 1300 cc of a 2.5 normal aqueous solution of anhydrous sodium acetate (3.4 mols). 10 grams of alcohol diacetone were added to give the acetyl acetone satisfactory solubility;

(3) The two solutions thus prepared were heated to a temperature of 55° C.;

(4) The second solution was slowly poured into the first one. A cobalt acetyl acetonate precipitate was obtained which was filtered and if necessary washed several times on the filter with demineralised water. The precipitate was pure and well crystallised so that there was no need for recrystallisation.

The amount of cobalt acetyl acetonate $Co(C_5H_7O_2)_2.2H_2O$ recovered was 120 gr.

Iron acetyl acetonate was then prepared in an identical manner, starting from 76 gr of $FeCl_3.6H_2O$ (0.28 mols) which was dissolved exclusively in demineralised water. The other reagents set forth in step 2) above were used in proportion to the molarity of iron chloride.

The amount of iron acetyl acetonate recovered was 71 g.

The filmogenic solution was then prepared by first dissolving 71 g of iron acetyl acetonate in 1 liter of glacial acetic acid over a period of about 15 minutes and then slowly dissolving 120 grams of cobalt acetyl acetonate over a period of about 45 minutes in the already prepared solution of iron acetyl acetonate. The result was a solution which did not need to be filtered and which was suitable for spraying onto pre-heated substrate (in the present example pre-heated to 500° C.)

The foregoing method resulted in a solution which was stable for a number of days.

The solution was heated to 70° C. and sprayed onto a glass ribbon continuously produced in known manner by drawing it upwardly from a supply of molten glass and into an annealing lehr, the solution being sprayed onto the glass ribbon at a place where the ribbon was at a temperature of 580° C. Use was made of an internally mixing atomising gun fed with the coating solution and compressed air, both at a pressure of 1.5 kg/cm² above atmospheric pressure. The nozzle of the gun was at a distance of 25 cm from the glass ribbon. The gun was continuously reciprocated transversely of the direction of movement of the ribbon, the speed of such movement being 1.5 meters per minute. The gun was reciprocated at a frequency of 1 reciprocation every six seconds (width of glass ribbon 3 meters).

The gun delivered 15 liters of solution per hour, corresponding to a delivery of solution of 0.04 liters per square meter of glass ribbon and an actual deposit of 0.03 liters per square meter, taking account of losses.

The coated drawn sheet glass had a tint which was bronze in transparency and grey in reflection, the thickness of the film of oxides being 400 Å.

To demonstrate how optical properties vary with layers of cobalt and iron oxides in different relative proportions and different thicknesses, Tests B and C were also carried out which differed from the operational point of view only in the concentrations of cobalt acetyl acetonate and iron acetyl acetonate per liter of acetic acid. Thus, in Test B, 133 g of iron acetyl acetonate and 96 g of cobalt acetyl acetonate were used per liter of acetic acid. In Test C, 186 g of iron acetyl acetonate and 57 g of cobalt acetyl acetonate were used.

The following Table sums up the properties of the films obtained in Tests A, B and C.

|  | A | B | C |
|---|---|---|---|
| Concentrations of the oxides in the coating: parts by weight { Fe₂O₃ | 70 | 50 | 30 |
| Co₃O₄ | 30 | 50 | 70 |
| Coating thickness (Å) | 400 | 550 | 450 |
| Tint by transmitted light | Amber | Brownish-grey | Bronze |
| Light transmission (%) | 45.9 | 41.1 | 46 |
| Light reflection at coated side (%) | 32.9 | 32.8 | 27.3 |
| Energy transmission (%) | 56.9 | 52.5 | 56.2 |
| Energy reflection at coated side (%) | 25.5 | 27.1 | 21.8 |
| Energy absorption (%) | 17.6 | 20.4 | 22 |

Very similar results were obtained by dissolving iron acetyl acetonate and cobalt acetyl acetonate in acetonitrile, nitrobenzene, tetramethylurea, tetramethylenesulphone, ethylene carbonate or hexamethylphosphoramide.

EXAMPLE 4

150 g of cobalt acetylacetonate and 150 g of iron acetylacetonate were dissolved in 1 liter of dimethylformamide and the resulting solution was sprayed on seven sample pieces of flat glass preheated to a temperature of the order of 580° C.

The spraying conditions were regulated so as to obtain coatings which increased in thickness from one sample to another, the several coatings however containing the cobalt and iron oxides in identical proportions. The optical and energy characteristics of the coatings are summarised in the following Table in which the samples, placed in increasing order of the thickness of their coatings, are numbered 1 to 7.

| Sample No. | 1 | 2 | 3 | 4 | 5 | 6 | 7 |
|---|---|---|---|---|---|---|---|
| Tint by reflected light | grey | slightly yellowish | yellow | pink to purple | purple | blue to purple | blue |
| Tint by transmitted light | Bronze | Bronze | —deeper bronze— | | | | brown |
| Light transmission (%) | 38.1 | 34.4 | 33.6 | 32 | 30.4 | 24.7 | 20 |
| Light reflection (%) | 36.8 | 38.6 | 30.4 | 25 | 21.4 | 17.9 | 25.7 |
| Energy transmission (%) | 46.6 | 41.6 | 40.7 | 39 | 37.9 | 34.8 | 35.2 |
| Energy reflection (%) | 29.3 | 33 | 31.7 | 29.9 | 28.1 | 25.9 | 24 |
| Energy absorption (%) | 24.1 | 25.4 | 27.6 | 31.1 | 34 | 39.3 | 40.2 |
| Light transmission / Energy transmission | 0.82 | 0.82 | 0.82 | 0.82 | 0.80 | 0.71 | 0.57 |

EXAMPLE 5

A coating comprising 80% by weight of cobalt oxide and 20% by weight of iron oxide was formed on a heat-absorbing flat glass 5 mm in thickness and of a conventional composition.

The procedure adopted was the same as in Example 3 (Test A) except that the concentrations of the reagents were altered. Thus, the acetyl acetonate was produced starting from 122 gr of $CoCl_2.6H_2O$ and 40.5 gr of $FeCl_3.6H_2O$. The other reagents were used, as in Example 3 (Test A) in the amounts of 300 cc of demineralised water and 100 cc of ethyl alcohol, then 120 gr of acetyl acetone, 150 gr of sodium acetate and 400 cc of demineralised water.

The result was 153 gr of cobalt acetyl acetonate and 53 gr of iron acetyl acetonate.

To prepare the filmogenic solution, the 53 gr of iron acetyl acetonate and then the 153 gr of cobalt acetyl acetonate were successively dissolved in 1 liter of glacial acetic acid.

Care was taken to observe the various precautions stated in Example 3 (Test A).

The coating solution was sprayed onto heat resisting glass at 580° C. by means of an atomising gun as used in Example 3.

The thickness of the formed coating was 400 Å. The following Table summarises the optical and energy characteristics of a heat resisting glass of the kind specified before and after the coating operations.

|  | before coating | after coating |
|---|---|---|
| Light transmission | 77.8% | 33.7% |
| Energy transmission | 51.4 | 29 |
| Energy reflection | 6.1 | 25 |
| Energy absorption | 42.5 | 46 |
| Light reflection | 7.6 | 31 |

The ratio between light transmission and energy transmission of an ordinary uncoated glass was only 1.03:1; the corresponding ratio for uncoated heat-resisting glass as used in this Example was 1.51:1; while for the coated heat-resisting glass the corresponding ratio was 1.16:1.

The radiation reflecting properties were greatly increased.

The same results were obtained by using a filmogenic solution using dimethylformamide instead of glacial acetic acid as solvent.

EXAMPLE 6

Six acetyl acetonates, namely those of nickel, cobalt, vanadium, manganese, chromium and copper were prepared by methods analogous to that described in Example 3. Titanyl and zirconium acetyl acetonates were prepared by a different method, namely in the case of titanyl acetyl acetonate by reacting titanium isopropylate with acetyl acetone and removing the resulting isopropyl alcohol by evaporation; and in the case of zirconium acetyl acetonate by reacting an aqueous solution of zirconium nitrate with acetyl acetone in the presence of an alkali metal carbonate, more particularly sodium carbonate. Thorium acetyl acetonate was prepared in the same way as zirconium acetyl acetonate.

Each of these acetonates was dissolved in a solvent, whereafter pairs of solutions of different such acetyl acetonates were mixed together and each resulting solution was sprayed onto glass pre-heated to 600° C.

The various solutions and the coatings formed therefrom are specified below, the stated percentages being by weight:

(a) A coating constituted by a mixture of 30% NiO and 70% $Co_3O_4$ was formed by spraying a solution containing in propylamine as solvent, 62 g of $Ni(C_5H_7O_2)_2$ and 153 g of $Co(C_5H_7O_2)_2.2H_2O$ per liter. The coated glass had a bronze tint when viewed by transmitted light and was clearer than the coated glass formed in Example 3.

(b) A coating constituted by a mixture of 70% $V_2O_5$ and 30% $ZrO_2$ was formed by spraying a solution containing, in acetic acid as solvent, 161 g of $V(C_5H_7O_2)_3$ and 71 g of $Zr(C_5H_7O_2)_4$ per liter. The coated glass had a yellow tint viewed by transmitted light. The light reflection was 35%.

(c) A coating constituted by a mixture of 70% $MnO_2$ and 30% $Cr_2O_3$ was formed by spraying a solution containing, in formic acid as solvent, 170 g of $Mn(C_5H_7O_2)_3$ and 83 g of $Cr(C_5H_7O_2)_2$ per liter. The coating tint was brown as viewed by transmitted light.

(d) A coating constituted by 40% CuO and 60% $TiO_2$ was formed by spraying a solution containing, in propylene diamine as solvent, 79 g of $Cu(C_5H_7O_2)_2$ and 118 g of $TiO(C_5H_7O_2)_2$ per liter. The coating tint was brownish grey viewed by transmitted light. The light reflection was 38%. In another test, a solution of the same mixture of acetyl acetonates in acrylic acid was used. The result was the same.

The hardness and adherence of the layers in Examples 3 and 6(a) (b) (c) (d) were tested by means of the reciprocating rubbing element as hereinbefore described. In this test, it took between 100 and 150 minutes to scratch 95% of the surface subjected to the rubbing action.

EXAMPLE 7

A solution of titanyl acetylacetonate (prepared by the method described in Example 6) in dimethylacetamide was sprayed onto a grey glass plate 6.5 mm in thickness, pre-heated to a temperature of 550° C.

The energy characteristics of the grey glass before and after coating were as follows:

|  | Uncoated grey glass | Grey glass coated with $TiO_2$ |
|---|---|---|
| Light transmission (%) | 38.0 | 25.9 |
| Light reflection (%) | 5.3 | 27.6 |
| Energy transmission (%) | 39.2 | 31.7 |
| Energy reflection (%) | 5.0 | 20.0 |
| Energy absorption (%) | 55.8 | 48.3 |

It is notable that the presence of the metal oxide layer reduced the energy absorption. Such a coating therefore reduces the risk of breakage of the glass due to heating by absorbed radiation, which is an important advantage for glazing sheets formed from this type of glass.

EXAMPLE 8

In a first test, a filmogenic solution was prepared, comprising iron acetylacetonate: $Fe(C_5H_7O_2)_3$, vanadium acetylacetonate $V(C_5H_7O_2)_3$ and cobalt acetylacetonate $Co(C_5H_7O_2)_2$.

These acetylacetonates were dissolved in dimethylformamide to a total concentration corresponding to 60 g/liter of oxide (viz. 5 g/liter of $Fe_2O_3$, 5 g/liter of $V_2O_5$ and 50 g/liter of $Co_3O_4$).

In a second test, a filmogenic solution was prepared comprising only iron acetylacetonate and cobalt acetylacetonate, these compounds being dissolved in the same solvent, i.e., dimethylformamide. The solution contained quantities of the acetylacetonate corresponding to a concentration of about 55% by weight of $Co_3O_4$ and 45% by weight of $Fe_2O_3$.

The two solutions were sprayed onto two samples of glass of the same thickness, pre-heated to the same temperature.

The properties of the coatings were found to be as follows:

|  | 1st test Coating: $Fo_2O_3 + Co_3O_4 + V_2O_5$ | 2nd test Coating: $Fe_2O_3 + Co_3O_4$ |
|---|---|---|
| Light transmission (%) | 36.1 | 36.1 |
| Light reflection (%) | 35.8 | 37.7 |
| Energy transmisssion (%) | 42.7 | 46.1 |
| Energy Reflection (%) | 31.8 | 29.7 |
| Energy absorption (%) | 25.5 | 24.2 |

It is to be noted that one can obtain coatings having the same light transmission but a different energy transmission by simply varying the composition of the layer. Thus, the coating obtained in the first test had a smaller energy transmission than the coating which was obtained in the second test in which the same operating conditions were observed but in which the coating composition contained only two metal acetylacetonates.

EXAMPLE 9

Two groups of filmogenic solutions were prepared, containing in the one case iron acetylacetonate, together with the acetyl acetonate of thorium or yttrium or cerium, and in the other case iron acetylacetonate together with the acetyl acetonate of aluminum or magnesium.

Each mixture of acetyl acetonates was dissolved in dimethylsulphoxide in such concentrations that the metal oxide coating formed by spraying the solution onto heated glass, contained 23% by weight of $Fe_2O_3$ and 77% by weight of the other metal oxide.

The optical and energy characteristics of the oxide coatings thus obtained were as follows:

|  | $Fe_2O_3$ + ($ThO_2$, $Y_2O_3$ or $CeO_2$) | $Fe_2O_3$ + ($Al_2O_3$ or MgO) |
|---|---|---|
| Energy transmission (%) | 69.3 | 74.0 |
| Energy reflection at coated side (%) | 18.8 | 18.2 |
| Energy reflection at uncoated side (%) | 21.0 | 18.6 |
| Energy absorption at coated side (%) | 11.9 | 7.8 |
| Energy absorption (%) uncoated side (%) | 9.7 | 7.4 |
| Light transmission | 70.3 | 73.8 |
| Light reflection at coated side | 22.5 | 22.8 |
| Light reflection at uncoated side | 23.8 | 23.1 |
| Light transmission / Energy transmission | 1.01 | 1.00 |

EXAMPLE 10

Solutions of tungsten acetylacetonate in dimethylformamide was prepared, to which bismuth or indium acetylacetonate was added.

The concentrations of the different acetylacetonates were chosen so that on spraying said solution onto heated glass, a layer was obtained of which the calculated weight was 70% $WO_3$ and 30% $Bi_2O_3$ or $In_2O_3$.

The coatings obtained by spraying such a solution onto a piece of glass pre-heated to a temperature of the order of 600° C. were of greenish yellow tint when viewed by transmitted light.

It will be understood that this invention is susceptible to modification in order to adapt it to different usages and conditions, and accordingly, it is desired to comprehend such modifications within this invention as may fall within the scope of appended claims.

What is claimed is:

1. In a process for forming a metal oxide coating on a substrate wherein a solution of at least one metal compound is applied to the substrate and said compound is converted in situ by heating to a temperature within the range of 300° C. to 700° C. to convert said metal compound and leave a coating of at least one metal oxide, the step of coating the substrate with a solution of an acetylacetonate of a metal selected from the group: Fe, Ni, Co, Zn, V, Mn, Cu, In, Al, Ti, Zr, Th, Cr, Mg, Bi, Y, W, Ce or a mixture of acetylacetonates of two or more metals of such group in a solvent, the improvement wherein the solvent is selected from the group consisting of ethylene diamine, propylene diamine, butylamine, propylamine, dimethylformamide, dimethylacetamide, tetramethylurea, dimethylsulfoxide, acetonitrile, nitrobenzene, ethylene carbonate, tetramethylenesulfone, hexamethylphosphoramide, or a mixture of two or more solvents selected from solvents of that group.

2. In a process according to claim 1, wherein the substrate is preheated to a sufficiently high temperature to provide the heat required to effect said conversion of the metal compound or compounds.

3. In a process according to claim 1, wherein the solution is applied in droplet form.

4. In a process according to claim 1, wherein the solution is applied to a substrate which is at least partly vitreous.

5. In a process according to claim 4, wherein the solution is applied so as to form a light-transmitting metal oxide coating.

6. In a process according to claim 5, wherein the formed metal oxide coating has a thickness in the range of 200 to 1000 A.

7. In a process according to claim 1, wherein the substrate is flat glass which is in course of being manufactured as a continuous ribbon.

8. A process according to claim 7, wherein the solution is applied to the glass ribbon at a zone where its temperature is in the range of 450° to 650° C.

9. A process according to claim 1, wherein the solution applied to the substrate contains no water or contains distilled water in a proportion of not more than 10% by volume.

* * * * *